United States Patent
Simperl et al.

(10) Patent No.: US 7,334,461 B2
(45) Date of Patent: Feb. 26, 2008

(54) METHOD OF MEASURING EXHAUST GAS ON INTERNAL COMBUSTION ENGINES

(75) Inventors: Johann Simperl, Thal (AT); Hans Erlach, Kühnsdorf (AT); Kurt Engeljehringer, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 11/499,874

(22) Filed: Aug. 7, 2006

(65) Prior Publication Data

US 2007/0033996 A1  Feb. 15, 2007

(30) Foreign Application Priority Data

Aug. 11, 2005 (AT) .............................. GM550/2005

(51) Int. Cl.
*G01M 15/00* (2006.01)
(52) U.S. Cl. ..................................................... 73/118.1
(58) Field of Classification Search ............... 73/23.31, 73/23.32, 116, 117.2, 117.3, 118.1
See application file for complete search history.

(56) References Cited

U.S. PATENT DOCUMENTS

| | | | |
|---|---|---|---|
| 7,021,130 B2* | 4/2006 | Schmidt | 73/118.1 |
| 2004/0226354 A1* | 11/2004 | Schmidt | 73/118.1 |
| 2005/0061054 A1* | 3/2005 | Silvis et al. | 73/1.06 |

(Continued)

FOREIGN PATENT DOCUMENTS

AT 006824 4/2004

(Continued)

OTHER PUBLICATIONS

Abstract of DE 19505415, Aug. 1996.

(Continued)

*Primary Examiner*—Eric S. McCall
(74) *Attorney, Agent, or Firm*—Dykema Gossett PLLC

(57) ABSTRACT

In a method of measuring exhaust gas of internal combustion engines, preferably in test benches, through the use of CVS (constant value sampling) full-flow systems, the exhaust gas of the internal combustion engine is mixed with combustion gas, preferably air, and the volume flow or mass flow of the combustion air is determined by the CVS full-flow system. This mass flow exceeds thereby the maximum quantity of combustion air needed by the internal combustion engine. An essentially constant and fully conditioned quantity of humidity-conditioned and/or temperature-conditioned combustion gas is fed into the internal combustion engine at any time, whereby this quantity is at least equal to the maximum quantity needed by the internal combustion engine, and whereby combustion gas not needed is fed into the CVS full-flow system, and a pre-determinable set pressure value is adjusted for the combustion gas upstream from the CVS full-flow system and also upstream from the point of conditioning of the combustion gas to be able to use the CVS full-flow systems increasing control dynamics without considerable effects on the entire control system and to avoid thereby dilution of the engine exhaust gases upstream from the CVS full-flow system. An essentially constant and fully conditioned quantity of humidity-conditioned and/or temperature-conditioned combustion gas can possibly be fed at any time into the CVS full-flow system, whereby fully conditioned combustion gas is drawn from the CVS full-flow system upstream from the mixing area to be used by the internal combustion engine.

13 Claims, 2 Drawing Sheets

U.S. PATENT DOCUMENTS

2005/0160838 A1* 7/2005 Weaver .................. 73/863.03
2006/0185425 A1* 8/2006 Erlach et al. ................. 73/116
2007/0033996 A1 2/2007 Simperl et al.

FOREIGN PATENT DOCUMENTS

| DE | 4015818 | 4/1991 |
|---|---|---|
| DE | 19505415 | 8/1996 |
| WO | 0242730 | 5/2002 |

OTHER PUBLICATIONS

Abstract of DE 4015818, Apr. 1991.

* cited by examiner

METHOD OF MEASURING EXHAUST GAS ON INTERNAL COMBUSTION ENGINES

BACKGROUND OF THE INVENTION

1. Field of the Invention

The invention relates to a method of measuring exhaust gas of internal combustion engines, preferably in test benches, through the use of CVS (constant value sampling) full-flow systems whereby the exhaust gas of the internal combustion engine is mixed with combustion gas, preferably air, and whereby the volume flow or mass flow of the combustion air is determined by the CVS full-flow system and whereby the maximum quantity of combustion air needed by the internal combustion engine is thereby exceeded. The invention relates further to a device to carry out the method of measuring exhaust gas of internal combustion engines, preferably exhaust gas measurement in test benches, through the use of CVS full-flow systems.

2. The Prior Art

The condition of the intake air influences the operational behavior of an internal combustion engines to a large degree. Since the development of internal combustion engines have placed increasingly higher requirements relative to the reproducibility and accuracy of test results, and based on exhaust gas regulations becoming more stringent worldwide as well as the higher power density, it is therefore necessary to eliminate all influences as much as possible which would influence the test results in the development of engines. Since the condition of the intake air is included in these influences, it is necessary to condition this intake air to achieve comparable test conditions at the test bench. The atmospheric pressure is a significantly influencing value specifically for certification whereby testing systems have been known to be problem cases for already a long time relative to unfavorable geodetic and climatic situations.

Known systems for conditioning of intake air for internal combustion engines are commercially available (e.g. the Combustion Air Conditioning Unit of AVL List GmbH, Graz/Austria or FEV AirCon of FEV Motorentechnik GmbH, Aachen/Germany). However, these systems are directly connected to the air supply system of the internal combustion engine and they must follow in this way the changes of the operating condition of the internal combustion engine and the resulting change of airflow rate, and these systems must also follow thereby directly the changes of the rate of airflow of the internal combustion engine itself. During rapid and dynamic changes of air flow in the engine, as described in general also in DE 40 15 818 C2, these changes can be followed only to a limited degree so that only a poor quality of adjustment can be achieved during the dynamic changes in the rate of airflow.

PCT/AT01/00371 describes a device and a method whereby a reliable and constant conditioning of the combustion air can be ensured even under highly dynamic operational conditions in which essentially a constant and fully conditioned quantity of the combustion gas is provided at each instant which corresponds to at least the maximum quantity required by the respective internal combustion engine. Through this measure, conditioning does not have to be performed again dynamically since the engine on the test bench has branches in the supply line for the maximal required quantity of combustion air diverting the quantity of combustion air need for the actual respective operating conditions. The conditioning system disposed upstream has to be designed nevertheless for the maximum quantity of combustion air whereby a constant mass flow passes through the conditioning passage in the case of the invention whereby control is made correspondingly simple.

According to a variant of AT 6824 U2 is was proposed that the volume flow or mass flow of the combustion gas is adjusted downstream from the internal combustion engine to avoid possible pulsations of the entire adjustment system and to considerably increase the adjustment dynamics so that changes in set values can be performed very rapidly with the least possible influence on the entire adjustment system. A set value for the apparatus is determined thereby as a defined function of the atmospheric pressure, the desired set pressure value, and the characteristic of the apparatus so that the set pressure value can be determined upstream from the internal combustion engine from the actual value of the set value of the apparatus through a defined function whereby the actual set pressure value is adjusted upstream from the internal combustion engine.

However, systems are now required which are suitable to be used together with CVS full-flow systems at increased control dynamics without large effects on the entire adjustment system whereby dilution of the engine exhaust gases must be avoided upstream of this CVS full-flow system. Systems with rapid pressure control circuits currently proposed for this purpose, which maintain the intake air condition nearly constant, do not offer the desired quality of control and conditioning.

SUMMARY OF THE INVENTION

A method of the aforementioned type has been modified to create such a system in that an essentially constant and fully conditioned quantity of humidity-conditioned and/or temperature-conditioned combustion gas is fed into the internal combustion engine at any time whereby this quantity is at least equal to the maximal quantity needed by the internal combustion engine and whereby combustion gas not needed is fed into the CVS full-flow system, and wherein a pre-determinable set pressure value is adjusted for the combustion gas upstream from the CVS full-flow system and also upstream from the point of conditioning of the combustion gas. An overly large design of the CVS systems can be avoided through this improvement for which exhaust gas dilution upstream from the CVS system does also not have to be taken into consideration and additional combustion gas conditioning systems are no longer required for certification test benches. This special version has the additional advantage that smaller, more cost-effective conditioning systems can be used since the combustion gas quantity has to exceed the quantity needed by the engine by a factor 1.5 to 2 at the most.

The method could be alternatively designed in that an essentially constant and fully conditioned quantity of humidity-conditioned and/or temperature-conditioned combustion gas is fed into the CVS full-flow system whereby this amount is at least equal to the quantity maximal required by the internal combustion engine, whereby fully conditioned combustion gas is drawn from the CVS full-flow system upstream from the mixing area to be used by the internal combustion engine and whereby the exhaust gases of the combustion engine are fed again into the mixing area of the CVS full-flow system, and whereby a pre-determinable set pressure value is adjusted for the humidity-conditioned and/or temperature-conditioned combustion gas upstream from the CVS full-flow system. This variant can be employed in currently existing and also larger conditioning systems which can condition at least four times the combustion gas quantity which corresponds to the maximum quantity consumed by the engine.

It is proposed according to an advantageous embodiment of the invention that an exchange of combustion gas is maintained between the CVS full-flow system upstream from the mixing area and the connection passage to the internal combustion engine.

According to an additional embodiment example, an additional increase in accuracy of the measurement values can be achieved if all openings of the internal combustion engine normally open to the atmosphere are integrated in pressure control having the pre-determinable set pressure value of the combustion gas and are preferably included also in the full conditioning of the combustion gas.

All atmospheric sensor mechanisms of the internal combustion engine are advantageously integrated in the pressure control process having the pre-determinable set pressure value of the combustion gas and they are preferably included also in the full conditioning process of the combustion gas.

It can be proposed for testing projects conducted only in part throttle regions of the internal combustion engine that an essentially constant and fully conditioned quantity of a humidity-conditioned and/or temperature-conditioned combustion gas is fed at any time into the internal combustion engine or the CVS full-flow system whereby this quantity is at least equal to the maximum quantity required by the internal combustion engine for the maximum operational load of the engine so that the sufficient amount for operation can be determined in case of small conditioning systems or conditioning systems operating at part throttle. Such systems can preferably be employed in motor vehicle engines operating at part throttle.

To be equipped for all possible operational conditions and testing projects, one embodiment proposes that the quantity of essentially constant and fully conditioned supply of the humidity-conditioned and/or temperature-conditioned combustion gas is at least equal to the maximum quantity required by the internal combustion engine at maximum load possible. This variant is also advantageous for utility vehicles operating mostly at full load.

A device to carry out the method, including a CVS full-flow system, is characterized for achievement of the aforementioned object in that at least one adjustable pressure control device is provided upstream from the system consisting of the internal combustion engine and the CVS full-flow system, whereby a conditioning device for humidity-conditioning and/or temperature-conditioning is provided downstream from the pressure control device in the supply line of the internal combustion engine, and whereby a connecting line branches off downstream from said conditioning device leading to the CVS full-flow system and said connecting line ends at the CVS system in front of the mixing area.

An alternative solution is offered by a device which is characterized according to another embodiment of the invention in that a conditioning device for humidity-conditioning and/or temperature-conditioning of the combustion gas as well as at least one adjustable pressure control device is provided upstream from the CVS full-flow system and that a connecting line branches off toward the internal combustion engine upstream from the mixing area of the CVS full-flow system.

The entire internal combustion engine can be integrated into the pressure control process as well as into the conditioning process and the accuracy of the exhaust gas measurement can be further improved if devices are provided to feed combustion gas to the openings normally open to the atmosphere whereby the combustion gas is drawn from a point downstream from the pressure control device.

The highest increase of accurate data in exhaust gas analysis is achieved if devices are provided to feed all atmospheric sensors with combustion gas drawn downstream from the pressure control device.

It can be proposed for exhaust gas measurements taken mainly at part throttle operation that the conditioning device is designed for a specific quantity of combustion gas whereby said quantity is at least equal to the maximum quantity needed by the internal combustion engine for a maximum operational load on the engine so that a sufficient amount of combustion gas can be determined by means of a conditioning device of a small design.

To be able to carry out exhaust gas measurements for all operational conditions, it could be advantageously proposed that the quantity of the essentially constant and fully conditioned supply of humidity-conditioned and/or temperature-conditioned combustion gas is at least equal to the quantity needed by the internal combustion engine operating at maximum load possible.

The invention is described in the following description in more detail with the aid of accompanying schematic drawings.

DETAILED DESCRIPTION OF THE PREFERRED EMBODIMENTS

Figure 1:
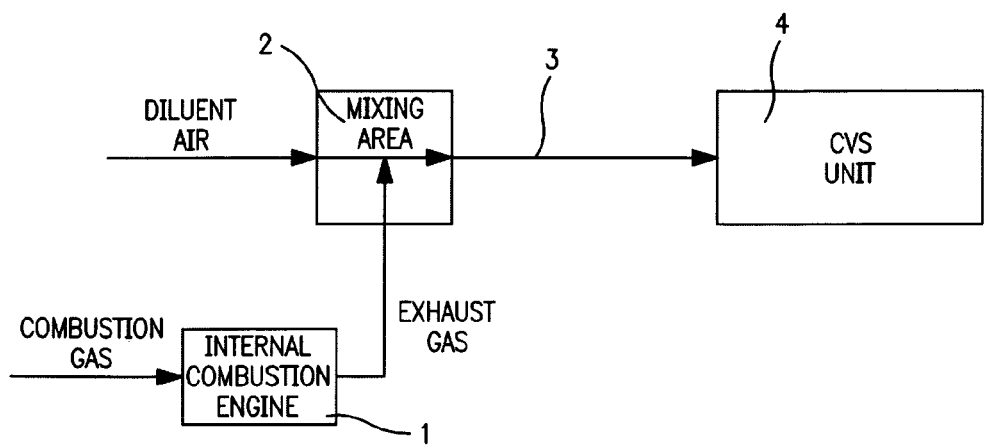
FIG. 1 shows thereby in schematic illustration how exhaust gas measurements are conducted with the use of a CVS full-flow system according to the traditional state-of-the-art.

According to the known method illustrated in FIG. 1, combustion gas is supplied for an internal combustion engine 1 and the exhaust gas of the internal combustion engine 1, e.g. a spark ignition engine or a diesel engine, is fed into the mixing area 2 of the CVS full-flow system. The combustion gas is mixed therein with diluent air and is fed through a connecting line 3 for spark ignition engines or a diluting passage for diesel motors into the actual CVS unit 4.

Figure 2:
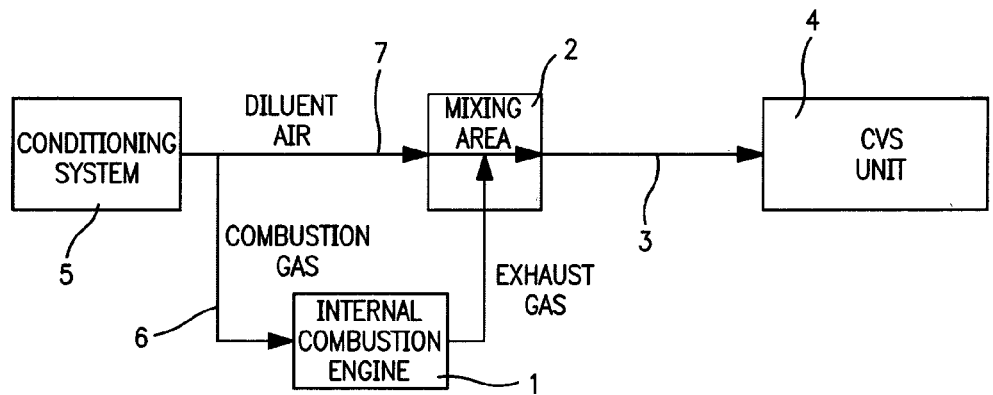
FIG. 2 is a schematic illustration of the method according to the invention in which pressure-conditioning as well as temperature-conditioning and/or humidity-conditioning takes place upstream from the branching-off point of the combustion air from the diluent air for the CVS system.

In a first embodiment according to the invention schematically illustrated in FIG. 2 there is proposed the conditioning of the combustion gas in a conditioning device 5 whereby a line 7 for the diluent air branches off to the mixing area 2 of the CVS system 2, 3, 4 from the line 6 of the combustion air leading to the internal combustion engine 1 so that this system 2, 3, 4, is supplied with fully pressure-conditioned and temperature-conditioned diluent air having exactly the same characteristics as the characteristics existing in the internal combustion engine 1. Exhaust gas from the internal combustion engine 1, e.g. a spark ignition engine or a diesel engine, is again fed into the mixing area 2 of the CVS full-flow system 2, 3, 4 and it is mixed with the now fully conditioned diluent air and it is fed into the actual CVS unit 4 through a connecting line 3 in case of spark ignition engines or through a diluting passage in case of diesel engines.

Figure 3:
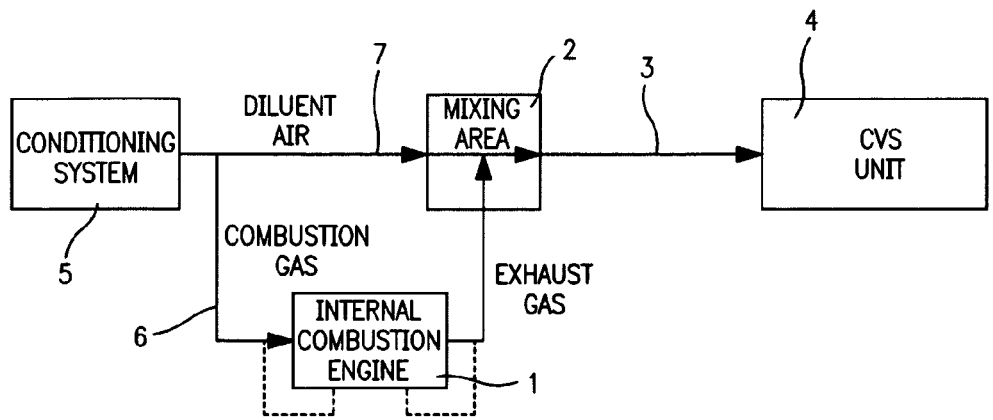
FIG. 3 is a schematic illustration of an expanded variant of FIG. 2 with pressure compensation on the engine at the side intake and the side of discharge.

An advantageous variant of the invention is illustrated in FIG. 3 wherein all intake and discharge openings of the internal combustion engine 1 open to the atmosphere are connected to line 6 for the combustion gas and/or to the exhaust gas line. Complete integration of the entire internal combustion engine 1 is achieved with pressure-conditioning as well as preferably temperature-conditioning and/or humidity-conditioning. All atmospheric sensors of the internal combustion engine 1 are advantageously integrated in the conditioning process to ensure optimally accurate exhaust gas analyses.

Figure 4:
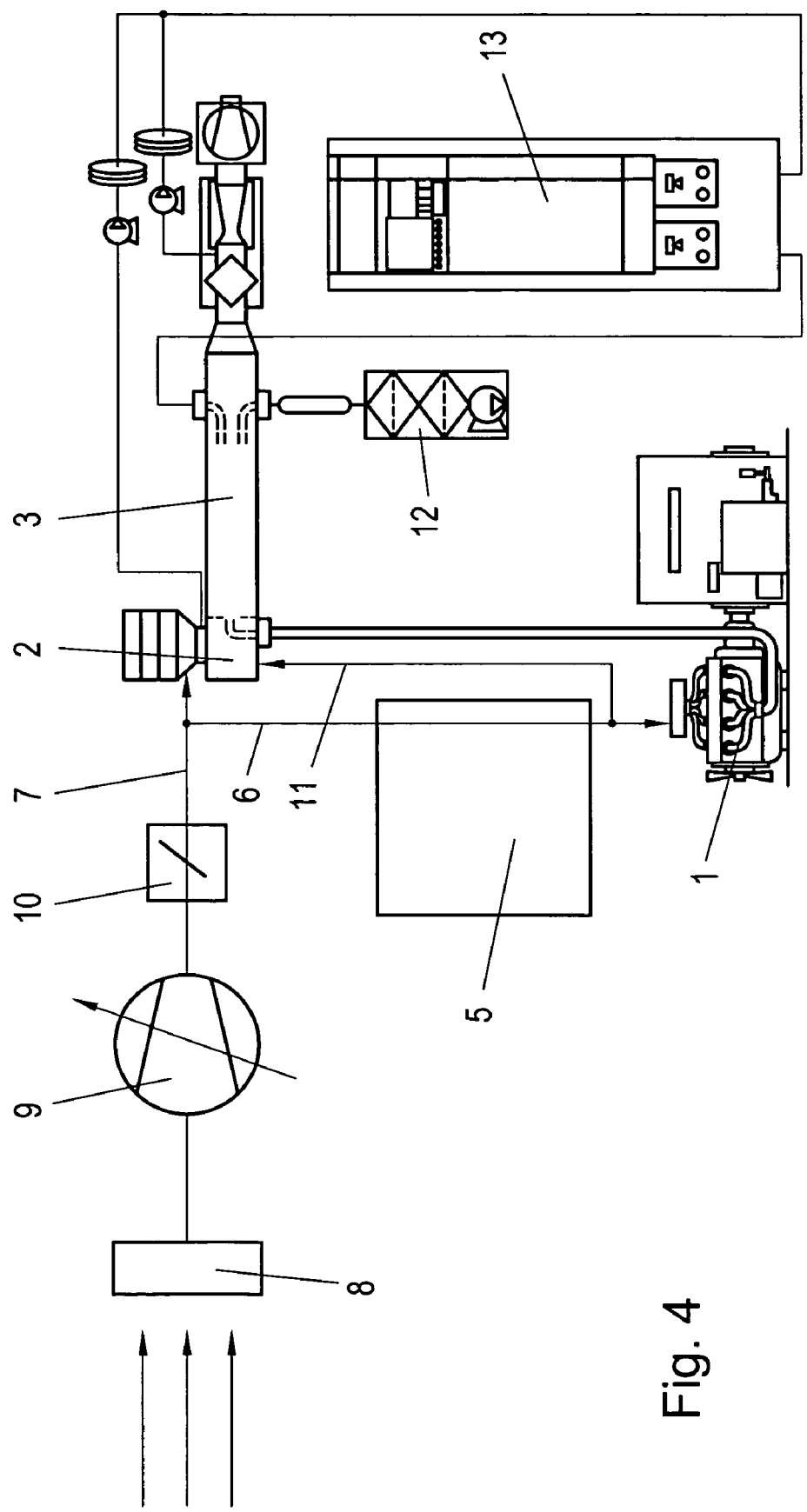
FIG. 4 is a schematic illustration of a device for exhaust gas analysis on internal combustion engines whereby pressure adjustment is performed again upstream from the branching-off point of the combustion air from the diluent air for the CVS system and whereby the device for temperature-conditioning and humidity-conditioning if provided between this branching-off point and the internal combustion engine itself.

FIG. 4 shows schematically a system to carry out the method according to the invention in an additional embodiment. The ambient air is suctioned in through filter 8 and fed to an internal combustion engine 1, here especially a diesel engine, through a blower 9 as well as through a controllable throttling device 10 of a CVS full-flow system 2, 3. A conditioning system 5 is now provided downstream from the branching-off point of the line 7 for the diluent air leading to the diluting passage 3 of the CVS system 2, 3, 4 of the line 6 which must be designed in this instance for a quantity that is maximal 1.5 to 2 times the quantity of combustion air required by the internal combustion engine 1. Any combustion air not needed by the internal combustion engine 1 is fed into the mixing area 2 of the CVS system 2, 3, 4 downstream from the connecting line 11 branching off from the conditioning system 5 whereby said mixing area 2 is formed in this case by the front section of the diluting passage that is common in CVS systems for diesel engines. A sampling unit 12 for particles as well as an analyzing unit 13 for the exhaust gas is attached at the back section of the diluting passage 3. Associated devices to ensure a constant volume flow of diluted exhaust gas is finally illustrated at the end of the diluting passage 3.

We claim:

1. A method of measuring exhaust gas of internal combustion engines, preferably in test benches, through the use of CVS (constant value sampling) full-flow systems whereby exhaust gas of the internal combustion engine is mixed with combustion gas, preferably air, and whereby the volume flow or mass flow of the combustion air is determined by the CVS full-flow system and whereby the maximum quantity of combustion air needed by the internal combustion engine is thereby exceeded, characterized in that an essentially constant and fully conditioned quantity of humidity-conditioned and/or temperature-conditioned combustion gas is fed into the internal combustion engine at any time whereby this quantity is at least equal to the maximum quantity needed by the internal combustion engine and whereby combustion gas not needed is fed into the CVS full-flow system, and wherein a pre-determinable set pressure value is adjusted for the combustion gas upstream from the CVS full-flow system and also upstream from the point of conditioning of the combustion gas.

2. A method of measuring exhaust gas of internal combustion engines, preferably in test benches, through the use of CVS full-flow systems whereby exhaust gas of the internal combustion engine is mixed with combustion gas, preferably air, and whereby the volume flow or mass flow of the combustion air is determined by the CVS full-flow system and whereby the maximum quantity of combustion air needed by the internal combustion engine is thereby exceeded, characterized in that an essentially constant and fully conditioned quantity of humidity-conditioned and/or temperature-conditioned combustion gas is fed at any time into the CVS full-flow system whereby this amount is at least equal to the quantity maximal required by the internal combustion engine, whereby fully conditioned combustion gas is drawn from the CVS full-flow system upstream from the mixing area to be used by the internal combustion engine and whereby the exhaust gases of the combustion engine are fed again into the mixing area of the CVS full-flow system, and whereby a pre-determinable set pressure value is adjusted for the humidity-conditioned and/or temperature-conditioned combustion gas upstream from the CVS full-flow system.

3. A method according to claim 2, whereby an exchange of combustion gas is maintained between the CVS full-flow system upstream from the mixing area and the connection to the internal combustion engine.

4. A method according to claim 2, whereby all openings of the internal combustion engine normally open to the atmosphere are integrated in pressure control having the pre-determinable set pressure value of the combustion gas and are preferably included also in the full conditioning of the combustion gas.

5. A method according to claim 2, whereby all atmospheric sensor mechanisms of the internal combustion engine are advantageously integrated in the pressure control process having the pre-determinable set pressure value of the combustion gas and are preferably included also in the full conditioning process of the combustion gas.

6. A method according to claim 2, whereby an essentially constant and fully conditioned quantity of a humidity-conditioned and/or temperature-conditioned combustion gas is fed at any time into the internal combustion engine or the CVS full-flow system whereby this quantity is at least equal to the maximum quantity required by the internal combustion engine for the maximum operational load on the engine.

7. A method according to claim 6, whereby the quantity of essentially constant and fully conditioned supply of humidity-conditioned and/or temperature-conditioned combustion gas is at least equal to the maximum quantity required by the internal combustion engine at maximum load possible.

8. A device to carry out the method of measuring exhaust gas of internal combustion engines, preferably exhaust gas measurement in test benches, through the use of CVS full-flow systems, wherein at least one adjustable pressure control device (5, 9, 10) is provided upstream from the system consisting of the internal combustion engine (1) and the CVS full-flow system (2, 3, 4), whereby a conditioning device (5) for humidity-conditioning and/or temperature-conditioning is provided downstream from the pressure control device (5, 9, 10) in the supply line (6) of the internal combustion engine (1), and whereby a connecting line (11) branches off downstream from said conditioning device (5) leading to the CVS full-flow system (2, 3, 4) and said connecting line (11) ends at the CVS system (2, 3, 4) in front of the mixing area (2).

9. A device according to claim 8 wherein the quantity of the essentially constant and fully conditioned supply of humidity-conditioned and/or temperature-conditioned combustion gas is at least equal to the quantity needed by the internal combustion engine (1) operating at maximum load possible.

10. A device to carry out the method of measuring exhaust gas of internal combustion engines, preferably exhaust gas measurement in test benches, through the use of CVS full-flow systems, wherein a conditioning device (5) for humidity-conditioning and/or temperature-conditioning of the combustion gas as well as at least one adjustable pressure control device (5, 9, 10) is provided upstream from the CVS full-flow system (2, 3, 4) and a connecting line (6) branches off toward the internal combustion engine (1) upstream from the mixing area (2) of the CVS full-flow system (2, 3, 4).

11. A device according to claim 10, including devices to feed combustion gas to the openings of the internal combustion engine (1) normally open to the atmosphere whereby the combustion gas is drawn from a point downstream from the pressure control device (5, 9, 10).

12. A device according to claim 10, including devices to feed all atmospheric sensors of the internal combustion engine (1) with combustion gas drawn downstream from the pressure control device (5, 9, 10).

13. A device according to claim 10, wherein the conditioning device (5) is designed for a specific quantity of combustion gas whereby said quantity is at least equal to the maximum quantity needed by the internal combustion engine (1) for a maximum operational load on the engine (1).

\* \* \* \* \*